(12) United States Patent
Koeppel

(10) Patent No.: US 11,305,700 B2
(45) Date of Patent: Apr. 19, 2022

(54) UPPER ROOM SYSTEM FOR UTILITY VEHICLES

(71) Applicant: John Joseph Koeppel, Lacombe, LA (US)

(72) Inventor: John Joseph Koeppel, Lacombe, LA (US)

( * ) Notice: Subject to any disclaimer, the term of this patent is extended or adjusted under 35 U.S.C. 154(b) by 0 days.

(21) Appl. No.: 17/248,118

(22) Filed: Jan. 11, 2021

(65) Prior Publication Data

US 2021/0213886 A1    Jul. 15, 2021

Related U.S. Application Data

(60) Provisional application No. 62/958,906, filed on Jan. 9, 2020.

(51) Int. Cl.
| | | |
|---|---|---|
| *B60R 9/05* | (2006.01) | |
| *B62D 65/16* | (2006.01) | |
| *B62D 33/02* | (2006.01) | |
| *B60R 9/055* | (2006.01) | |

(52) U.S. Cl.
CPC .............. *B60R 9/055* (2013.01); *B62D 65/16* (2013.01)

(58) Field of Classification Search
CPC ...... B62D 65/16; B62D 33/0222; B60R 9/055
See application file for complete search history.

(56) References Cited

U.S. PATENT DOCUMENTS

| | | | | | |
|---|---|---|---|---|---|
| 3,508,786 | A | * | 4/1970 | Colville | B60P 3/32 296/99.1 |
| 4,580,827 | A | * | 4/1986 | Feagan | B60R 11/06 224/404 |
| 4,892,346 | A | * | 1/1990 | Berlin | B60R 9/00 224/404 |
| 5,088,636 | A | * | 2/1992 | Barajas | B60R 11/06 224/281 |
| 5,263,757 | A | * | 11/1993 | Reed | B60R 9/00 296/166 |
| 5,439,150 | A | * | 8/1995 | Trahms | B60R 9/00 224/281 |
| 5,464,264 | A | * | 11/1995 | Wilson | B60R 9/00 224/404 |
| 6,244,651 | B1 | * | 6/2001 | Hecock, Jr. | B60J 7/062 296/100.11 |
| 6,325,439 | B1 | * | 12/2001 | Crossman | B60R 9/00 296/100.09 |
| 6,626,479 | B1 | * | 9/2003 | Skoug | B60R 9/00 224/404 |
| 7,017,972 | B2 | * | 3/2006 | Rudolph | B60J 1/183 296/107.16 |
| 8,038,195 | B1 | * | 10/2011 | Hutcheson | B60R 9/00 296/37.6 |
| 10,399,478 | B2 | * | 9/2019 | Dorminey | B60P 7/10 |
| 2005/0017038 | A1 | * | 1/2005 | Johnson | B60R 11/06 224/404 |

(Continued)

*Primary Examiner* — Bayan Salone
(74) *Attorney, Agent, or Firm* — Dunlap Bennett & Ludwig, PLLC

(57) ABSTRACT

A upper room storage system for utility vehicles is provided. The upper room storage system is adapted to associate with a structural roof of a utility vehicle, so that when retrofitted to a utility vehicle with a cargo bed, the cargo bed maintains full functionality. The upper room storage system embodies a storage box with a plurality of lockable entry points, providing access from at least two sides of the utility vehicle.

9 Claims, 4 Drawing Sheets

(56) References Cited

U.S. PATENT DOCUMENTS

2011/0284602 A1\* 11/2011 Lamouroux ............ B60R 11/06
　　　　　　　　　　　　　　　　　　　　　224/402
2021/0016700 A1\* 1/2021 Thompson .............. B60P 1/649

\* cited by examiner

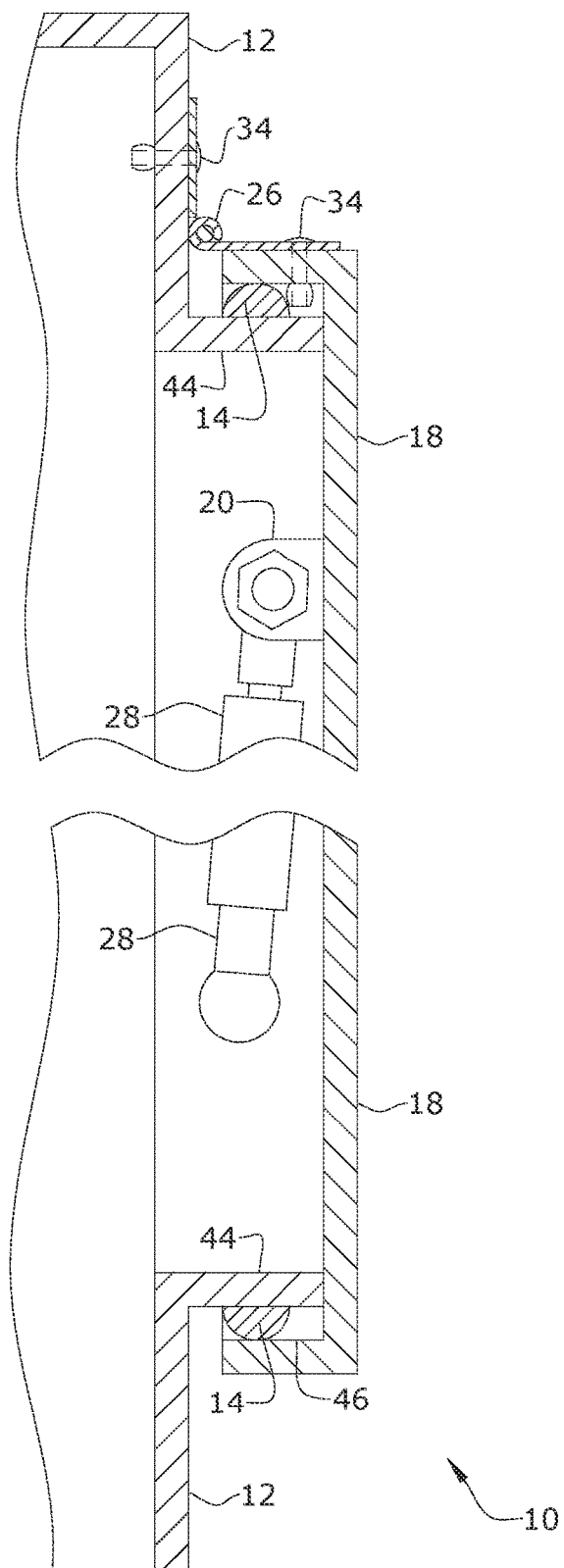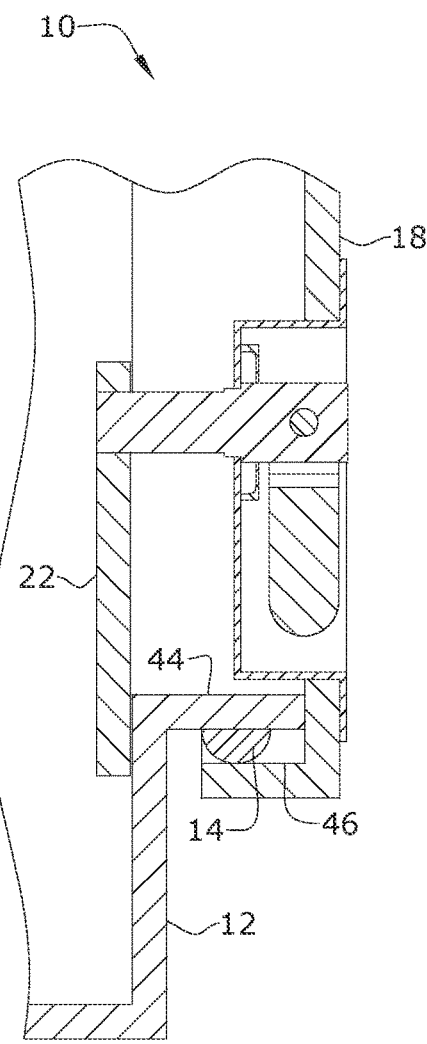
FIG.6
FIG.7

UPPER ROOM SYSTEM FOR UTILITY VEHICLES

CROSS-REFERENCE TO RELATED APPLICATION

This application claims the benefit of priority of U.S. provisional application No. 62/958,906 filed 9 Jan. 2020 the contents of which are herein incorporated by reference.

BACKGROUND OF THE INVENTION

The present invention relates to utility vehicles and, more particularly, a upper room storage system for utility vehicles.

Utility vehicles often include a rear cargo bed providing space for stowing tools, equipment, gear, and personal items. Typically, such cargo beds are not covered and so are exposed to the environmental elements. From time to time, users find it undesirable to store items in such cargo beds because being open to the environment means exposure to inclement weather and thieves. Furthermore, tools and other items sometimes must be tied or held down to prevent them from sliding around in a cargo bed during operation of the vehicle, as some items can be damaged, damage other items, and/or damage the sidewalls of the cargo bed.

As can be seen, there is a need for a upper room storage system for utility vehicles capable of nesting with a structural roof of the utility vehicle in such a way as to afford the cargo bed full functionality. The upper room storage system embodies a storage box with multiple entry points so that items can be securely and protectively stored outside of the cargo bed (and not in the vehicle's cab) up against the original roof of the utility vehicle. Accordingly, this new storage space allows drivers and passengers to separately secure items then need to be protected from theft, the elements, and/or other items in the cargo bed. In short, the present invention offers a practical no-nonsense approach to space-saving storage in utility vehicles that makes the ride safer and more comfortable and allows a user to carry more material/equipment to their job or hunting site, while not limiting the functionality of the cargo bed.

SUMMARY OF THE INVENTION

In one aspect of the present invention, a upper room storage system for a utility vehicle, the upper room storage system including the following: a storage box having at least two access openings; a door pivotably connected at each access opening so that each door is movable between an open position and a closed position; a lock on each door; and one or more mounting connectors connecting the storage box to a portion of the utility vehicle at a predetermined distance above a pivotable bed of the utility vehicle so that the pivotable bed does not contact the storage box when pivoting, wherein the storage box is a cuboid, and wherein each of the at least two access openings are on different faces of the cuboid, wherein the cuboid is elongated; struts operatively associated with each door, wherein said portion is a roll bar, wherein the storage box is covered by yet not connected to a roof of the utility vehicle, wherein each mounting connector is a mounting channel that circumscribes a portion of the roll bar; and a vibration dampener operatively associated with each mounting channel and said portion of the roll bar. The predetermined distance is a function of the cargo bed and may be between two to five feet.

In another aspect of the present invention, a method of retrofitting storage space to a utility vehicle so that the storage space is outside of a cargo bed and a cab of the utility vehicle, the method being: mounting the above-mentioned upper room storage system to the roll bar at said predetermined distance so that said upper room storage system is covered by yet not connected to the roof of the utility vehicle.

These and other features, aspects and advantages of the present invention will become better understood with reference to the following drawings, description and claims.

BRIEF DESCRIPTION OF THE DRAWINGS

FIG. 6 is a section view of an exemplary embodiment of the present invention, taken along line 6-6 in FIG. 4;

FIG. 7 is a section view of an exemplary embodiment of the present invention, taken along line 7-7 in FIG. 4.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a upper room storage system adapted to associate with a structural roof of a utility vehicle, so that when retrofitted to a utility vehicle with a cargo bed, the cargo bed maintains full functionality. The upper room storage system embodies a storage box with a plurality of lockable entry points, providing access from at least two sides of the utility vehicle.

Figure 1:
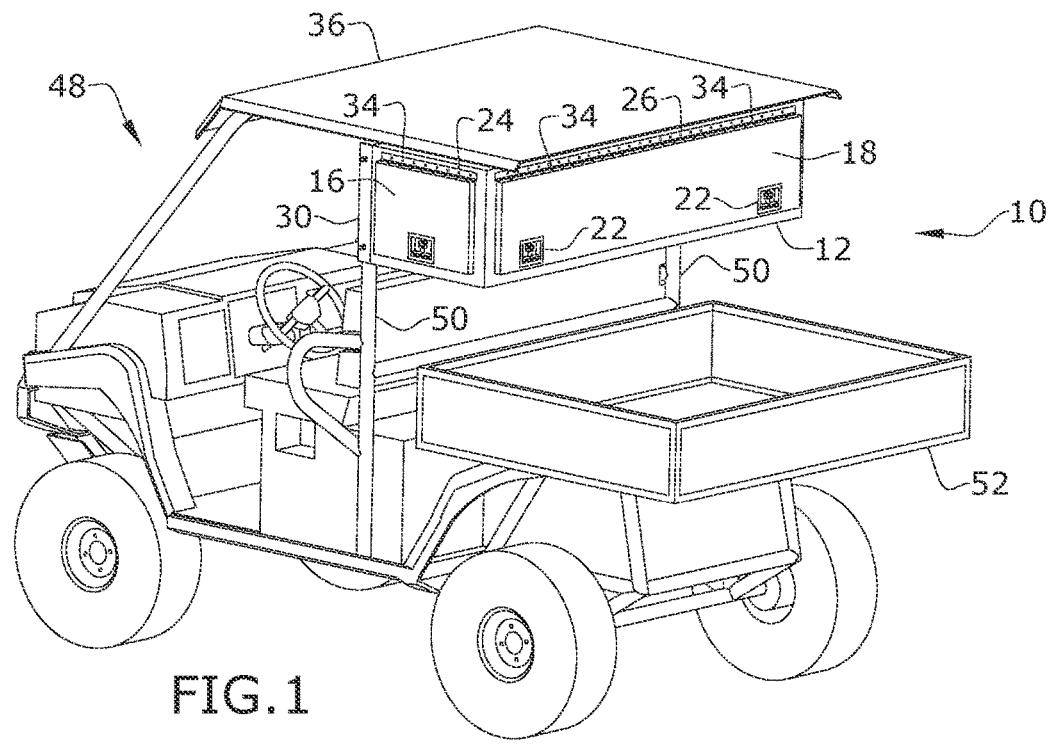
FIG. 1 is a perspective view of an exemplary embodiment of the present invention, shown in use.
Figure 2:
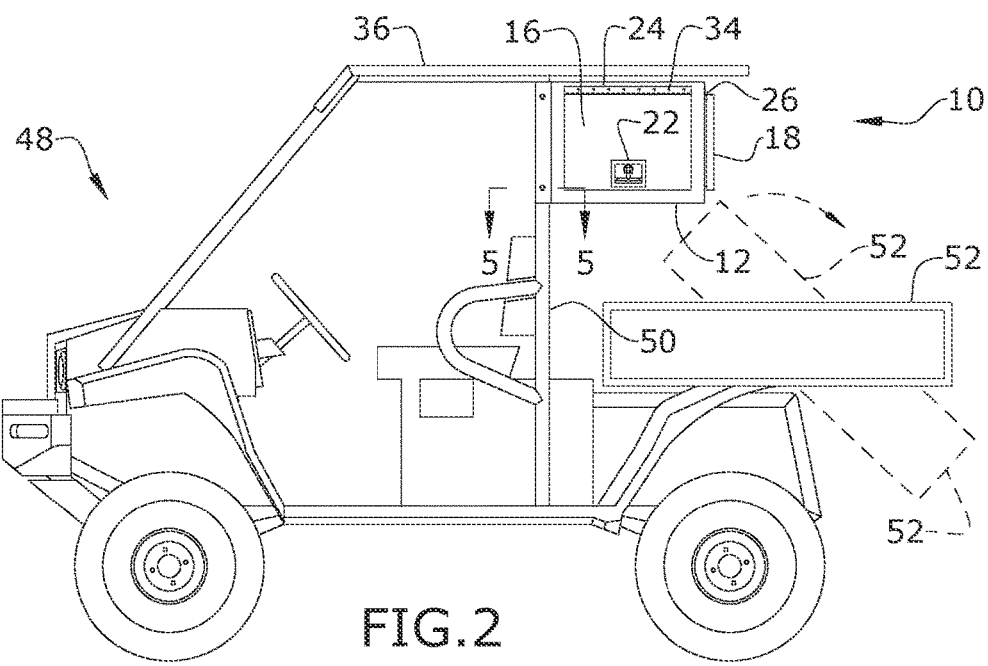
FIG. 2 is a side elevation view of an exemplary embodiment of the present invention, illustrating the full functionality of the cargo bed 52 enabled by the raised storage unit embodied by the present invention.
Figure 3:
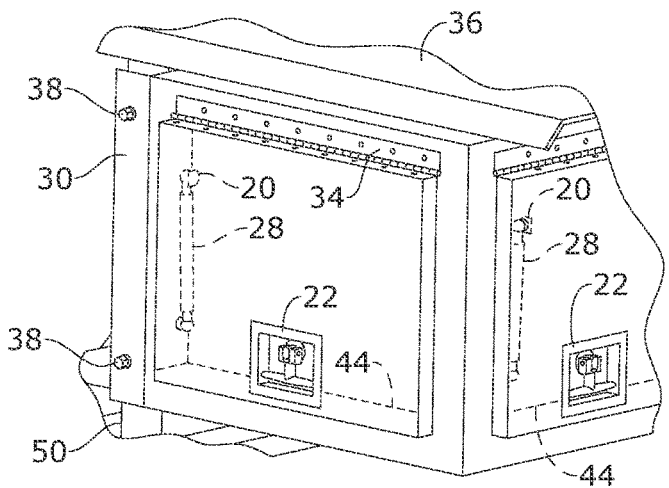
FIG. 3 is a detailed perspective view of an exemplary embodiment of the present invention.
Figure 4:
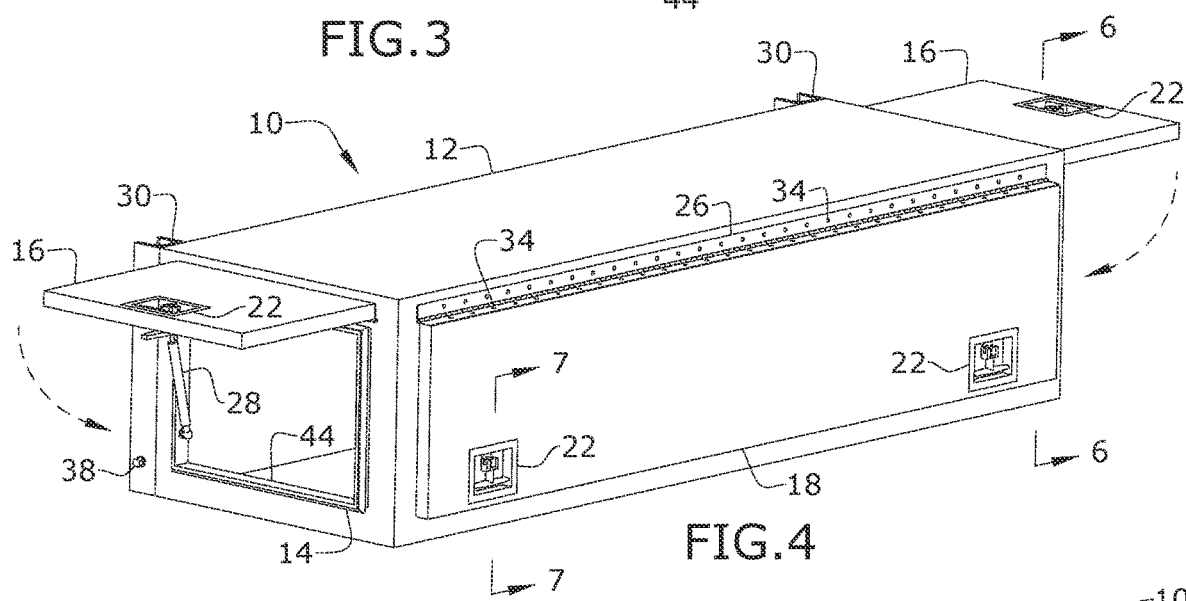
FIG. 4 is a perspective view of an exemplary embodiment of the present invention, illustrating the multiple points of entry.

Referring now to FIGS. 1 through 8, the present invention may include a upper room storage system 100 for a utility vehicle 48. The upper room storage system 100 embodies a storage box 12 that may be associable with the original roof 36 of the utility vehicle 48 above the working cargo bed 52 a predetermined distance to enable full functionality of the cargo bed 52, as illustrated in FIG. 2.

The storage box 12 has a plurality of openings allowing multiple entry points to the storage compartment of the storage box 12. In certain embodiments the plurality of openings may include two side openings and a rear opening, for a total of three openings. In other embodiments, though the drawings show two side openings, there may only be one side opening, where this side opening is either on the passenger side or the driver side of the utility vehicle 48 the storage box 12 is attached to, thereby the storage box 12 may have only two openings—one side opening and one rear opening.

It should be understood that directional terms such as 'side', 'rear', 'upward', 'downward', and the like may be defined relative to FIG. 1 and specifically the orientation of the utility vehicle 48 shown therein; for instance, the term 'rear' is directed to the right side of FIG. 1 which is rearward of the utility vehicle 48, while 'upward' is directed to the top of the FIG. 1, and so on.

Each opening may be sealed with a door 16, 18 and sealing members 44 and 46 along a perimeter of both. Weather stripping 14 may be operatively associated with the sealing members 44 and 46. Each door 16 or 18 may be pivotably connected to the storage box 12 by a pivotable connector 24 or 26, respectively. The pivotable connectors 24 and 26 may be, but necessarily limited to, piano hinges connected by way of fasteners 34. Each door 16 and 18 may have operatively associated struts 28 and 20, respectively, for facilitating a controllable movement between a closed position and an open position. Each door 16 and 18 may have operatively associated locks 22 for forming a locked engagement when the door 16 or 18 is in the closed condition.

Figure 5:
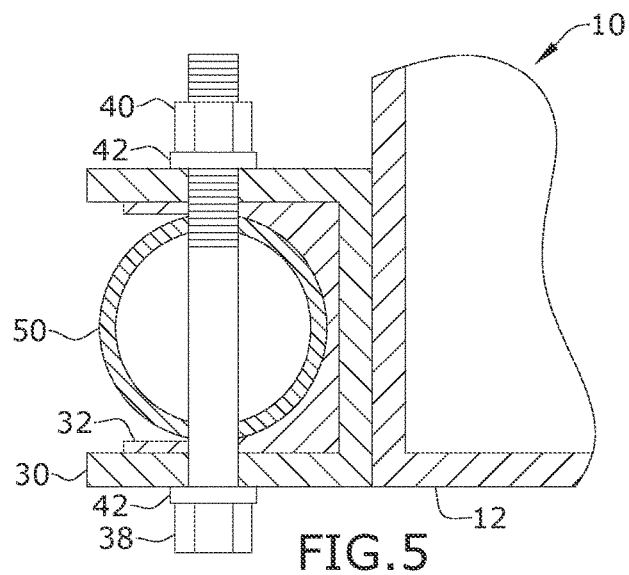
FIG. 5 is a section view of an exemplary embodiment of the present invention, taken along line 5-5 in FIG. 2.
Figure 8:
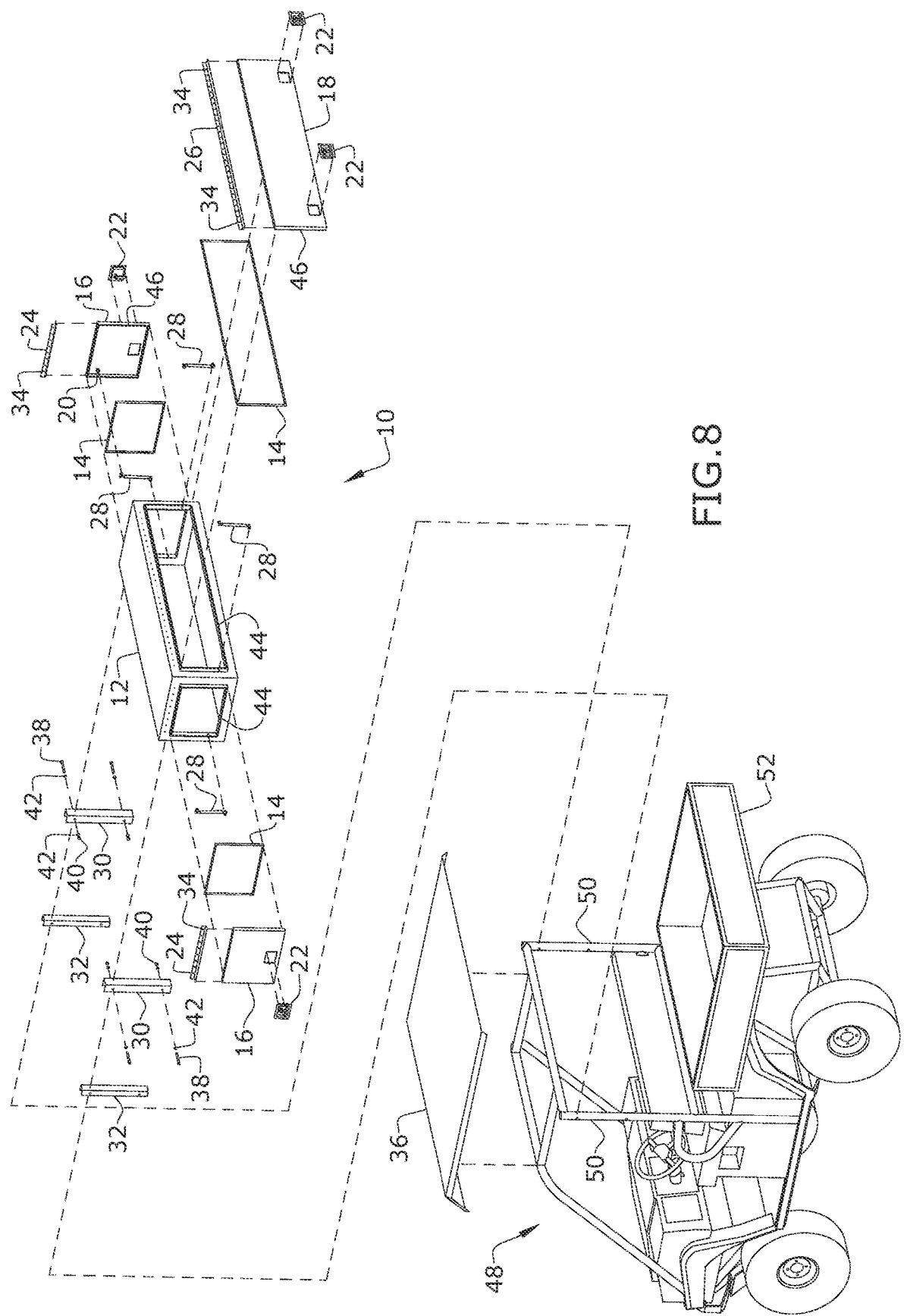
FIG. 8 is an exploded perspective view of an exemplary embodiment of the present invention.

In certain embodiments, the storage box 12 may be elongated—i.e., having a length double or more its depth and height—wherein depth and height defining the sides of the storage box 12. The length may be a function of spanning between two members of a roll bar 50 of the utility vehicle 48. The storage box 12 may be attached to the roll bar 50 by way of mounting channels 30 and fasteners 38, 40, and 42. Each mounting channel 30 may circumscribe a member of the roll bar 50, as illustrated in FIG. 5, so that vibrational dampeners 32 may be operatively associated between the mounting channel 30 and said roll bar 50 member. The connection to the roll bar 50 (as opposed to being connected to the structural roof 36) allows the upper room storage system 100 to be retrofitted to many different vehicles, including non-utility vehicles, as long as the vehicle has roll bars 50. It should be understood, that though not shown in the FIGS., the storage box 12 may be fabricated with a custom, integrated, structural roof 36.

The components of the present invention may be fabricated out of aluminum/high-density plastics or other sufficiently strong and durable metallic or plasticized materials.

In sum, the present invention opens up room within the limited space offered by some utility vehicles 48, making the ride safer and more comfortable and allowing the driver to carry more material/equipment to their job or hunting site. Moreover, though the present invention was originally designed for farm/hunting, the upper room storage system 100 would be a boon in many industrial fields where utility vehicles 48 are used to carry more tools safety equipment emergency equipment, etc., and in areas that are hard to get to with regular vehicles.

It should be understood, of course, that the foregoing relates to exemplary embodiments of the invention and that modifications may be made without departing from the spirit and scope of the invention as set forth in the following claims.

What is claimed is:

1. A storage system for a utility vehicle, the storage system comprising:
    a storage box having at least two access openings;
    a door pivotably connected at each access opening so that each door is movable between an open position and a closed position;
    a lock on each door; and
    one or more mounting connectors connecting the storage box to a portion of the utility vehicle at a predetermined distance above a pivotable bed of the utility vehicle so that the pivotable bed does not contact the storage box when pivoting.

2. The storage system of claim 1, wherein the storage box is a cuboid, and wherein each of the at least two access openings are on different faces of the cuboid.

3. The storage system of claim 2, wherein the cuboid is elongated.

4. The storage system of claim 3, further comprising struts operatively associated with each door.

5. The storage system of claim 4, wherein said portion is a roll bar.

6. The storage system of claim 5, wherein the storage box is covered by yet not connected to a roof of the utility vehicle.

7. The storage system of claim 6, wherein each mounting connector is a mounting channel that circumscribes a portion of the roll bar.

8. The storage system of claim 7, further comprising a vibration dampener operatively associated with each mounting channel and said portion of the roll bar.

9. A method of retrofitting a storage space to a utility vehicle so that the storage space is outside of a cargo bed and a cab of the utility vehicle, the method comprising:
    mounting the storage system of claim 8 to the roll bar at said predetermined distance so that said upper room storage system is covered by yet not connected to the roof of the utility vehicle.

* * * * *